March 31, 1970 S. KURLANDSKY 3,503,578
CHAIN FOR SUPPORTING FLEXIBLE CONDUIT
Filed Aug. 30, 1967 2 Sheets-Sheet 1
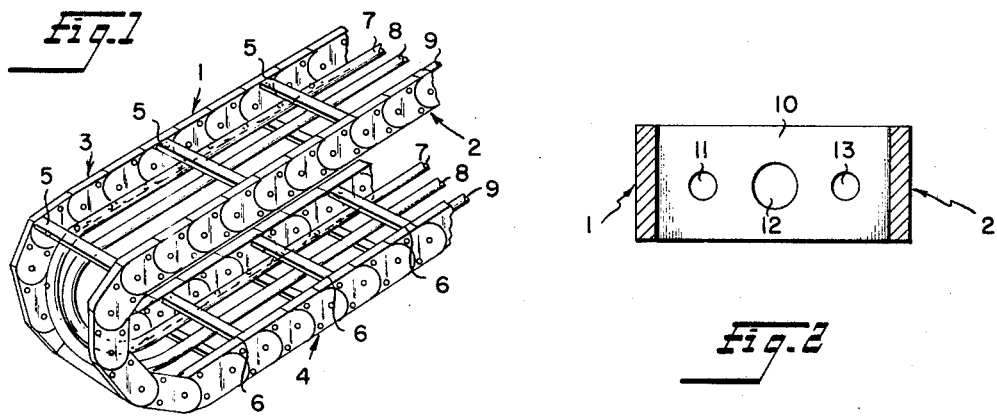
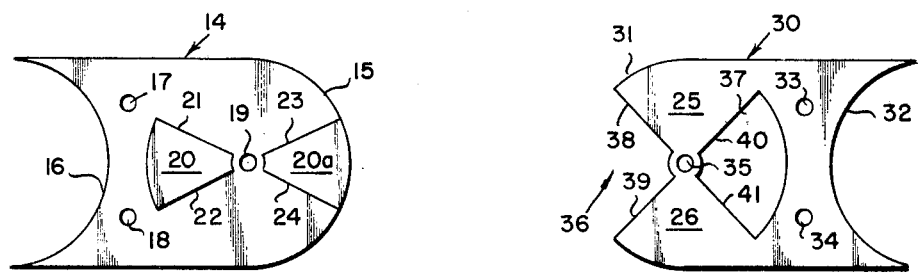

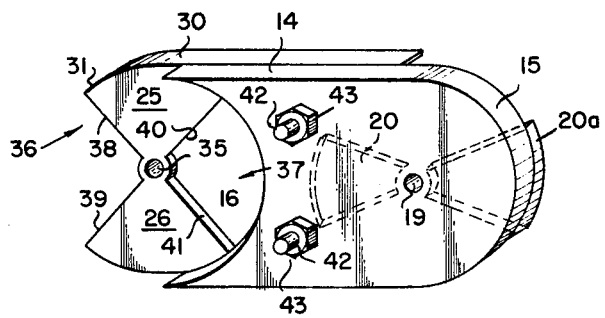
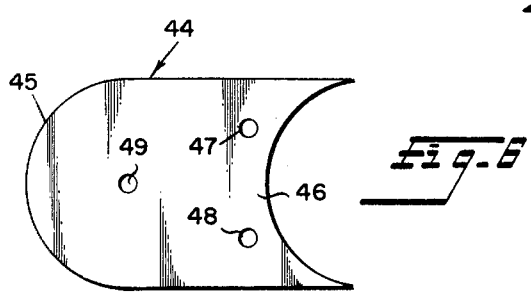
INVENTOR
Sam Kurlandsky
BY
ATTORNEYS

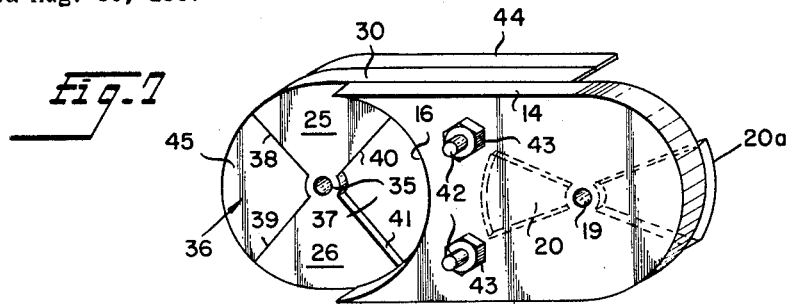
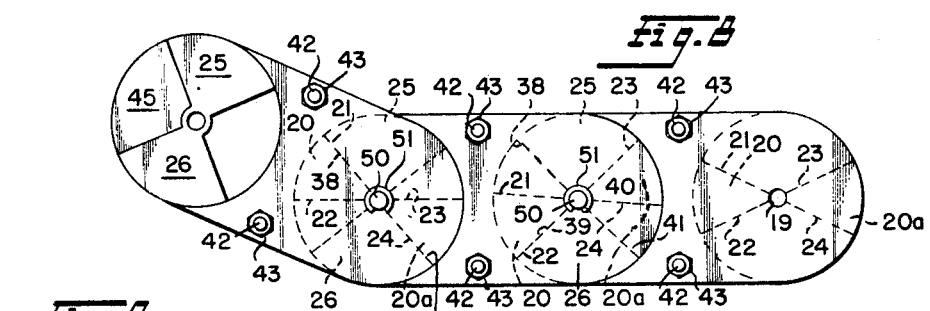
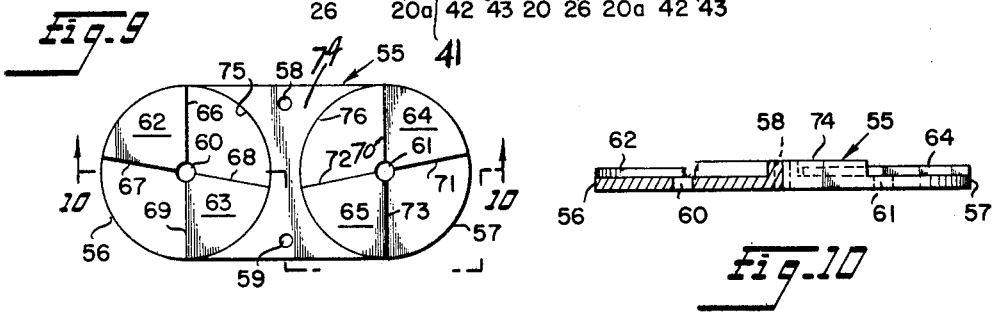
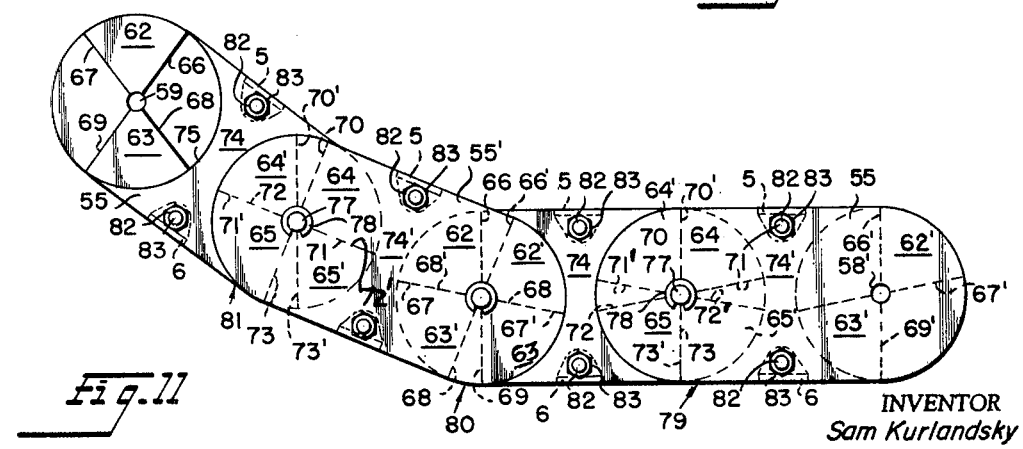

United States Patent Office 3,503,578
Patented Mar. 31, 1970

3,503,578
CHAIN FOR SUPPORTING FLEXIBLE CONDUIT
Sam Kurlandsky, Kalamazoo, Mich., assignor to Aero-Motive Mfg. Co., Kalamazoo, Mich., a corporation of Michigan
Filed Aug. 30, 1967, Ser. No. 664,511
Int. Cl. F16l 3/00
U.S. Cl. 248—51
23 Claims

ABSTRACT OF THE DISCLOSURE

A chain for supporting flexible conduit formed of links, pivotally interconnected at their ends, and having complementary circular sectors providing limiting positions of pivotal movement between the links of the chain, and providing double support at each limiting position to limit or prevent the imposition of shear force at the pivotal point.

BACKGROUND OF THE INVENTION

The present invention relates to chains and is more particularly concerned with a chain designed to support flexible conduits such as electrical cables and fluid conducting hoses which transport electricity and/or fluids to a movable station.

Apparatus has been disclosed in the prior art adapted to support conduits for electrical current, or liquid or gaseous media to stations which are adapted to move, particularly in a straight line, as for example large machine tools and cranes. Such apparatus utilizes one or more chains comprised of a plurality of interconnected links and having supporting means for the conduit.

Pivotal movement between the links is limited in one direction to a point where the links lie in a straight line and in the other position at an acute angle. Consequently, when in one position the chain is self-supporting in a straight line. Moreover, when turned in the other direction, the chain is self-supporting at a curvature having a predetermined radius. The chain is normally mounted with one end attached to a fixed station and the other attached to a station movable along a straight line path. The chain is normally arranged to extend as a horizontal "U" between the fixed station and the movable station, and in some embodiments is completely self-supporting. In other embodiments a supporting track or bed may be utilized. In most applications two parallel chains held in spaced apart relationship by conduit-supporting members are used.

Prior art chains as described above, although they are generally satisfactory in carrying out their function of supporting cables and conduits, are subject to the disadvantage that in each limiting position a substantial shear force is exerted on the pivot pin at each joint, thereby causing it to wear rapidly and to cause the apparatus to fail. This is particularly true when an operator stands upon the horizontal self-supporting portion of the chain, even though infrequently, during operation or maintenance. An additional disadvantage of some prior art chain supports is that the chains are complicated and expensive to produce.

SUMMARY OF THE INVENTION

It is an object of the invention to provide a chain support for flexible conduit which is self-supporting and is not necessarily supported by means of tracks. It is an additional object to provide a chain support of the type described which is relatively simple and inexpensive to build. It is a further object to provide a supporting chain wherein each pair of links is pivotal between two limiting positions, and wherein the shear force on the pivot is substantially reduced or even completely eliminated. It is a further object to provide a chain support wherein the chain links are fully covered, thereby protecting the operator and preventing foreign particles from entering and causing the chain to fail. The accomplishment of the foregoing and additional objects will become more fully apparent hereinafter.

According to the invention, a chain support for flexible conduit is provided comprised of a plurality of interconnected links, each adjacent pair of links being adapted to pivot at their ends between two limiting positions. In a preferred embodiment, the limits are so designed that the chain is horizontal in one limiting position, and curved about a predetermined radius of curvature at the other limit. In order to accomplish this result, the interconnected ends of each pair of adjacent links are provided with circular sectors, each sector defining a pair of substantially radially oriented limiting surfaces. The circular sectors on each link are so dimensioned and positioned that they intermesh and at each limiting position two limiting surfaces of one link engage two limiting surfaces of the other link, thereby providing two points of support, one at each side of the pivot point at each limiting position of pivotal movement, and substantially reducing or even completely eliminating the application of shear force on the pivot. Because of this reduction in shear force, the useful life of the pivot pin is greatly extended.

BRIEF DESCRIPTION OF THE DRAWINGS

The invention in its preferred embodiments is illustrated by the accompaning drawings in which:

FIG. 1 is a perspective view of a chain support assembly and supported conduits.

FIG. 2 is a cross-sectional view through a chain support assembly having a somewhat modified transverse supporting member.

FIG. 3 is a plan view of a plate which may be used for assembling a chain link according to the invention.

FIG. 4 is a plan view of a complementary plate.

FIG. 5 is a perspective view of a chain link formed by fixing together the plates shown in FIGS. 3 and 4.

FIG. 6 is a plan view of a cover plate.

FIG. 7 is a chain link formed by affixing together the plates of FIGS. 3, 4, and 6.

FIG. 8 is an elevational view of a chain segment prepared by affixing together a plurality of links according to FIG. 7.

FIG. 9 is a plan view of a link comprising another embodiment of the invention.

FIG. 10 is a cross sectional view taken at the line 10—10 of FIG. 9; and

FIG. 11 is an elevational view of a chain segment prepared from a plurality of links according to FIGS. 9 and 10.

DESCRIPTION OF THE PREFERRED EMBODIMENTS

Reference is now made to the accompanying drawings for a better understanding of the invention, wherein, all the parts are numbered and wherein the same numbers are used to refer to the same parts throughout.

Referring to FIG. 1, a chain support according to the invention is shown together with supported conduits, and comprises lateral chains 1 and 2 each comprised of a plurality of pivotally interconnected links 3 and 4, respectively. The lateral chains 1 and 2 are connected together at intervals by transverse supporting members 5 and 6. A plurality of conduits 7, 8, and 9 are supported between the supporting members 5 and 6. Alternatively, as shown in FIG. 2, single supporting member 10 may be utilized having openings 11, 12, and 13 provided therein through which the conduits extend. The supporting members, whether those of FIG. 1 shown by the numerals 5 and 6 or those of FIG. 2, may be affixed either at each link of the chain or may be spaced one or more links apart.

FIGS. 3 and 4 illustrate complementary plates which may be affixed together to form chain links constituting an embodiment of the present invention. The plate of FIG. 3 comprises a sheet-form body 14 having a convexly arcuate end 15, a concavely arcuate end 16, mounting holes 17 and 18 and a pivot pin hole 19. The plate additionally has circular sector members 20 and 20a, which may be affixed to the plate body 14 by suitable means such as welding. Alternatively the sectors may be formed by milling an integral plate, by diecasting an integral plate, or by molding an integral plate containing the sectors where the chain links are composed of a moldable plastic material. The sector member 20 defines substantially radial limiting surfaces 21 and 22 which are substantially perpendicular to the plane of the plate. The sector 20a is provided with substantially radially positioned limiting surfaces 23 and 24 which are also substantially perpendicular to the plane of the plate 14.

The complementary plate shown in FIG. 4 comprises a sheet-form body 30, a convexly arcuate end 31 and a concavely arcuate end 32. The plate has mounting holes 33 and 34 for affixing the plate to the plate of FIG. 3. Additionally, the plate has a pivot pin hole 35 and circular sector cutouts or openings 36 and 37. The opening 36 defines limiting surfaces 38 and 39 and the opening 37 defines limiting surfaces 40 and 41, all the limiting surfaces being substantially radially oriented with respect to the pivot pin hole 35. The sector openings 36 and 37 are designed to be complementary with the sectors 20 and 20a of the plate 14 to provide the proper amount and direction of pivotal movement. The structures are additionally designed so that at each limiting position of pivotal motion the limiting surfaces are contiguous on both sides of the pivotal point, thereby providing a supporting point on each side of the pivot point.

FIG. 5 illustrates a chain link prepared by affixing the plate 14 to the plate 30 by means of bolts 42 and nuts 43. The plates are affixed so that the concave ends of the two plates overlap. Additionally, at each end, the convex end of one plate and the concave end of the other plate are contiguous with the surface of an imaginary cylinder having its axis passing through the center of the pivotal point. A plurality of links may be interconnected to form a chain by means of pivot pins and pin retainers. A chain formed of the links of FIG. 5 is completely enclosed on one side. However, on the other side, the openings 36 and 37, as well as the sectors 20 and 20a retained therein are exposed. A completely shielded chain may be provided by placing cover plates 44, shown in FIG. 6, over the plate 30. The plate 44 has the same outer dimensions and shape as the plates of FIGS. 3 or 4, including a convex end 45, a concave end 46, mounting holes 47 and 48, and a pivot pin hole 49. The plate 44 is added to the link of FIG. 5 by affixing it over the outer surface of the plate 30 to form the link shown in FIG. 7. Alternatively the plates 30 and 44 may be formed as an integral unit by milling out or molding the cavities 36 and 37 at the surface of a single plate.

FIG. 8 illustrates a chain segment formed by interconnecting plurality of links of FIG. 7 by means of pivot pins 50 and retaining washers 51. A chain support as shown in FIG. 1 may be provided by connecting two separate chains together by means of transverse supporting members 5 and 6 which are affixed to the chains by means of the bolts 42 and nuts 43. As can be seen in FIG. 8 when two interconnecting links are arranged in a limiting position in which they are in a straight line, the limiting surface 23 of the sector 20a engages the limiting surface 40 of the sector 25. Similarly, the limiting surface 22 of the sector 20 engages the limiting surface 39 of the sector 26. Consequently a point of support is provided on each side of the pivot pin 50, thereby preventing the exertion of any shear force on the pin, and prolonging its useful life. Similarly, considering the two interconnecting links which are at an angle less than 180° with respect to each other, the limiting surface 24 of the sector 20a engages the limiting surface 41 of the sector 26, while the limiting surface 21 of the sector 20 engages the limiting surface 38 of the sector 25 thereby also providing a point of support on each side of the pivot pin 50. It can therefore be seen that the present structure provides a point of support on each side of the pivot pin at both limiting positions.

Although the sectors 25 and 26 have been shown in this embodiment as formed from a separate plate which is subsequently affixed by bolting, alternatively, a solid plate may be utilized and sectors affixed thereto by any suitable method such as welding, bolting, etc., similar to the sectors 20 and 20a of FIG. 3.

FIGS. 9–13 illustrate another embodiment of the invention wherein as shown in FIGS. 9–11 each link has a body 55 having two convex ends 56 and 57, mounting holes 58 and 59 and pivot pin holes 60 and 61. The link further comprises circular sectors 62, 63, 64, and 65. The sectors 62 and 63 are provided with limiting surfaces 66, 67, 68, and 69, and the sectors 64 and 65 are provided with limiting surfaces 70, 71, 72, and 73. The limiting surfaces are substantially radially aligned and substantially perpendicular to the plane of the surface of the link. The sectors are made of such size that sufficient play is provided to permit pivotal movement between two adjacent links. Limiting surfaces 66, 67, 68, 69, 70, 71, 72, and 73 are substantially radially disposed with respect to the pivot pin hole and are substantially perpendicular to the plane of the link. As used herein throughout, the term "substantially radially" is to be understood as including structures in which the limiting surfaces are generally disposed along a radius. However, many variations in direction and shape may be utilized. For example, limiting surfaces which are curved may be also utilized, as well as surfaces which are many shapes including tooth-formed. It is only necessary that the limiting surfaces be of such shape and position that they engage complementary limiting surfaces at two points, one at each side of the pivot point, and at both limiting positions of pivotal movement. In order to shield the convex ends of adjacent links, a raised insert member 74 having concave ends 75 and 76 may be employed. The sectors 62, 63, 64 and 65 are so arranged that corresponding sectors of an adjacent plate are received intermediate the sectors of the first plate, with sufficient clearance provided to result in the desired amount of pivotal movement.

FIG. 11 illustrates a chain support segment prepared by affixing together a plurality of links according to FIGS. 10 and 11 by means of pivot pins 77 and retaining washers 78. Transverse supporting members 5 and 6 are affixed to the chain by means of bolts 82 and nuts 83. Although not shown in the figure, the supporting members 5 and 6 are similarly affixed at the other ends to another chain which is spaced apart in parallel relation with respect to the first chain. In designating the numerals of the parts of the chain for purposes of understanding the function of the parts, for convenience, the parts of each link which are oriented in the same direction as that of the link shown in FIG. 9 are given numerals which are the same as those of the link. However, with regard to links which are reversed and which overlap the first named links, a prime (') character has been utilized following the number of each corresponding part.

The chain of FIG. 11 is so designed that in one limiting position of pivotal movement the links are aligned in a straight line, whereas in the other limiting position they are aligned at an angle less than 180° with respect to each, thereby permitting the chain to curve over a predetermined radius of curvature. With regard to the pivotal joint 79 shown in FIG. 11 wherein the links are oriented in a straight line, the limiting surface 70 of the sector 64 engages the limiting surface 70' of the sector 64'. Similarly the limiting surface 73 of the sector 65 engages the limiting surface 73' of the sector 65'. Consequently, a point of support is provided on each side of the pivot pin 77, thereby removing shear force therefrom. At the pivotal joint 80 the links are in the limiting position wherein they are oriented at an angle of less than 180° with respect to each other. In this position, the limiting surface 67 of the sector 62 engages the limiting surface 68' of the sector 63', and the limiting surface 68 of the sector 63 engages the limiting surface 67' of the sector 62'. Thus, here also two points of support, one on each side, are provided for the pivot pin 77. The same relationship exists with regard to the angled pivotal joint 81 wherein, in similar manner, the limiting surface 71 of the sector 64 engages the limiting surface 72' of the sector 65' and the limiting surface 72 of the sector 65 engages the limiting surface 71' of the sector 64'. Thus two points of support, one on each side of the pivot pin 77, are provided to prevent shear force from being imposed on the pivot pin.

Although as described and illustrated in the specification and drawings, the means providing the substantially radial limiting surfaces are in the form of circular sectors, a large variety of other shapes and forms may be utilized. Thus sectors having limiting surfaces of many different shapes may be utilized. Additionally, the limiting surfaces need not extend the full length of the radius but may be small segments thereof. Moreover, instead of a sector, a small ridge may be used to provide the limiting surface. It is only necessary that each pair of limiting surfaces be complementary so that the limiting surface of one link engages the limiting surface of the other link. Additionally, sector cut-outs or cut-outs in separate plates may be used.

The supporting chain structure of the present invention has a number of advantages over prior art structures. First, in addition to providing all the necessary functions of conduit support for the particular application, that is, providing two limits of pivotal movement between the two links so that the chain is self-supporting when extended horizontally at one limit, and self-supporting about a defined radius of curvature at the other limit, the present structure provides two points of support at opposite sides of the pivot point for each limiting position, thereby greatly reducing the shear force against the pivot pin and preventing rapid wear of the pivot pin and associated bearing structures. Moreover, the limiting surface structure may be so designed that all shear force is removed from the pivot structure at the limiting positions. The present structure has the further advantage that, because the links have mating convex and concave ends in the one embodiment and mating convex and concave surfaces between the plate ends and the insert surfaces in the other embodiment, the moving edges of the chain are completely shielded, and the possibility of injuries to the person of the operator eliminated. Moreover, because the chain in most of its embodiments is completely enclosed, it is virtually impossible for foreign particles such as metal turnings to become ensnared in the chain and thereby enter inside the chain and cause failure of operation. As a further advantage, the chain is made of simply cut and drilled flat plates which may be readily assembled and readily dismantled for repair or link replacement.

Although the structure of the present invention has been shown and described in relation to the use of metal plates, plastic plates may be substituted for many applications. Moreover, instead of using flat plates, unitary plastic or molded metal links may be utilized instead of links prepared by bolting together two or more plates.

Although in the embodiments described and shown in the drawings each link is comprised of only two or three plates, it is of course to be understood that 4, 5, 6, or even more plates may be utilized for certain purposes and are to be considered as falling within the invention disclosed and claimed. For example, additional plates may be utilized to give greater strength to each link. Additional plates having limit means may be utilized to provide greater strength at the limiting positions. Alternatively, very thin plates may be utilized at the outside of the link to serve as a cover or shield for the slots, notches, etc., which comprise the limit means. Additionally, instead of complete plates, partial plates may be utilized to cover the slots, notches, etc., which remain exposed, as for example, when only two plates are utilized in a link.

It is to be understood that the invention is not limited to the exact details of construction, operation, or exact materials or embodiments shown and described as obvious modifications and equivalents will be apparent to one skilled in the art.

I claim:

1. A support for a flexible conduit, said conduit being adapted to be operated with one end connected to a fixed station and the other end connected to a movable station, said support comprising at least one chain having conduit supporting means affixed thereto, said chain comprising a plurality of interconnected links, pivot means defining a pivotal point and connecting together the ends of each pair of adjacent links to provide pivotal movement with respect to each other, means for limiting said pivotal movement between two predetermined positions comprising means at each pivotal end of each link defining two pairs of circumferentially spaced-apart radially positioned limiting surfaces, the limiting surfaces of one end of one link being interposed between complementary limiting surfaces of the end of the adjacent link, at each limiting position two limiting surfaces of the end of one link disposed one on each side of said pivot means engaging two complementary limiting surfaces of the end of said adjacent link, thereby providing two points of support about said pivot means and reducing the shear force applied to said pivot means.

2. A support for a flexible conduit, said conduit being adapted to be operated with one end connected to a fixed station and the other end connected to a movable station, said support comprising a pair of chains having conduit supporting means intermediate and affixed to said chain and maintaining said chains in parallel spaced-apart relationship, each of said chains comprising a plurality of interconnected links, pivot means defining a pivotal point and connecting together the ends of each pair of adjacent links to provide pivotal movement with respect to each other, means for limiting said pivotal movement between two predetermined positions comprising means at each pivotal end of each link defining two pairs of circumferentially spaced-apart radially positioned limiting surfaces, the limiting surfaces of one end of one link being interposed between complementary limiting surfaces of the end of the adjacent link, at each limiting position two limiting surfaces of the end of one link disposed one on each side of said pivot means engaging two complementary limiting surfaces of the end of said adjacent link, thereby providing two points of support about said pivot means and reducing the shear force applied to said pivot means.

3. A support for a flexible conduit, said conduit being adapted to be operated with one end connected to a fixed station and the other end connected to a movable station, said support comprising a pair of chains having conduit supporting means intermediate and affixed to said chain and maintaining said chains in parallel spaced-apart relationship, each of said chains comprising a plurality of interconnected links, pivot means defining a pivotal point and connecting together the ends of each pair of adjacent links to provide pivotal movement with respect to each other, means for limiting said pivotal movement between two predetermined positions comprising means at each pivotal end of each link defining two pairs of circumferentially spaced-apart limiting surfaces, wherein said means defining two pairs of spaced-apart limiting surfaces comprises a pair of angularly spaced-apart sectors positioned at one surface of the pivotal end of each link, each sector defining a pair of substantially radially positioned limiting surfaces, the sectors at the end of one of a pair of interconnected links being positioned intermediate the sectors of the end of the other link, the limiting surfaces of one end of one link being interposed between complementary limiting surfaces of the end of the adjacent link, at each limiting position two limiting surfaces of the end of one link disposed one on each side of said pivot means engaging two complementary limiting surfaces of the end of said adjacent link, thereby providing two points of support about said pivot means and reducing the shear force applied to said pivot means.

4. A support according to claim 2, wherein said conduit supporting means comprises a plurality of transverse supporting members each affixed at one end to a link of one of said chains and at the other end to a link of the other of said chains, and wherein each supporting member is provided with an aperture adapted to have said conduit disposed therethrough.

5. A support according to claim 2, wherein each of said conduit supporting means comprises a pair of transverse supporting members each connected at one end to a link of one of said chains and at the other end to a link of the other of said chains, one of said supporting members being positioned at one edge of said chain and the other being positioned at the other edge of said chain, said conduit being adapted to be disposed intermediate said supporting members.

6. A support for a flexible conduit, said conduit being adapted to be operated with one end connected to a fixed station and the other end connected to a movable station, said support comprising a pair of chains having conduit supporting means intermediate and affixed to said chain and maintaining said chains in parallel spaced-apart relationship, each of said chains comprising a plurality of interconnected links, pivot means defining a pivotal point and connecting together the ends of each pair of adjacent links to provide pivotal movement with respect to each other, means for limiting said pivotal movement between two predetermined positions comprising means at each pivotal end of each link defining two pairs of circumferentially spaced-apart limiting surfaces, wherein each of said links comprises at least two plates of substantially equal size, each plate comprising a convexly arcuate end and a concavely arcuate end adapted to mate with the concavely arcuate end and convexly arcuate end, respectively, plates of adjacent links, the plates of each link being positioned in oppositely oriented direction with the concavely arcuate end of one plate overlapping and affixed to the concavely arcuate end of the other plate, at each end of said link the convexly arcuate end of one plate and the concavely arcuate end of the other plate being substantially contiguous with the surface of a common imaginary cylinder having its axis passing through said pivotal point, the limiting surfaces of one end of one link being interposed between complementary limiting surfaces of the end of the adjacent link, at each limiting position two limiting surfaces of the end of one link disposed one on each side of said pivot means engaging two complementary limiting surfaces of the end of said adjacent link, thereby providing two points of support about said pivot means and reducing the shear force applied to said pivot means.

7. A support according to claim 2 wherein said pivot means comprises pivot pin holes at pivotal points at each end of said links and a pivot pin journaled in said pivot pin holes.

8. A support for a flexible conduit, said conduit being adapted to be operated with one end connected to a fixed station and the other end connected to a movable station, said support comprising a pair of chains having conduit supporting means intermediate and affixed to said chain and maintaining said chains in parallel spaced-apart relationship, each of said chains comprising a plurality of interconnected links, pivot means defining a pivotal point and connecting together the ends of each pair of adjacent links to provide pivotal movement with respect to each other, means for limiting said pivotal movement between two predetermined positions comprising means at each pivotal end of each link defining two pairs of circumferentially spaced-apart limiting surfaces, wherein each link is comprised of three plates of substantially the same size, each plate comprising a convexly arcuate end and a concavely arcuate end adapted to mate with the concavely arcuate and convexly arcuate ends, respectively, of adjacent links, two of said plates (30, 44) being oriented in superposition and a third plate (14) being oppositely oriented to said two plates, the concavely arcuate ends (32, 46) of said superposed plates overlapping the concavely arcuate end (16) of said intermediate plate, and means affixing said plates together, the convexly arcuate ends (31, 45) of said superposed plates and the concavely arcuate end (16) of said oppositely oriented plate being substantially contiguous with the surface of a common imaginary cylinder whose axis passes through the pivotal point at the end of said link, and the concave ends (32, 46) of said superposed plates and the convex end (15) of said oppositely oriented plate being substantially contiguous with the surface of a common imaginary cylinder whose axis passes through the pivotal point at the other end of said link, said oppositely oriented plate (14) being provided with sectors (20, 20a) extending above the surface of said plate, and one of said superposed plates (30) in engagement with said superposed plate being provided with sector-form openings (36, 37) defining complementary sectors (25, 26) having limiting surfaces (38, 39, 40, 41), the raised sectors (20, 20a) being positioned within the sector-form openings of an adjacent link, and having limiting surfaces adapted to engage the limiting surfaces of the sectors (25, 26) of the plate (30) at each limiting position of pivotal movement, the limiting surfaces of one end of one link being interposed between complementary limiting surfaces of the end of the adjacent link, at each limiting position two limiting surfaces of the end of one link disposed one on each side of said pivot means engaging two complementary limiting surfaces of the end of said adjacent link, thereby providing two points of support about said pivot means and reducing the shear force applied to said pivot means.

9. A support according to claim 8, wherein said pivot means comprises pivot holes provided in the ends of said links and pivot pins journaled therein.

10. A support according to claim 8, wherein said limiting surfaces are substantially radially oriented with respect to said pivotal point.

11. A support for a flexible conduit, said conduit being adapted to be operated with one end connected to a fixed station and the other end connected to a movable station, said support comprising a pair of chains having conduit supporting means intermediate and affixed to said chain and maintaining said chains in parallel spaced-apart relationship, each of said chains comprising a plurality of interconnected links, pivot means defining a pivotal point and connecting together the ends of each pair of adjacent links to provide pivotal movement with respect to each other, wherein each link is comprised of plates each having two convex ends, each end being provided with a pair of sectors each sector defining a pair of limiting surfaces, at each pivotal joint the sectors of one plate being complementary with the sectors of the adjacent plate, at each limiting position, two limiting surfaces of the sectors of one plate engaging two limiting surfaces of the sectors of the adjacent plate, thereby providing two points of support about said pivot means and reducing the shear force applied to said pivot means.

12. A support to claim 11, wherein a raised portion is provided at the mid-portion of each link having two concavely arcuate ends adapted to nest and shield the convexly arcuate ends of adjacent links pivotally connected thereto.

13. A support according to claim 11, wherein said limiting surfaces are substantially radially oriented.

14. A chain comprising a plurality of interconnected links, pivot means defining a pivotal point and connecting together the ends of each pair of adjacent links to provide pivotal movement with respect to each other, means for limiting said pivotal movement between two predetermined positions comprising means at each pivotal end of each link defining two pairs of angularly spaced-apart radially positioned limiting surfaces, the limiting surfaces of one end of one link being interposed between complementary limiting surfaces of the end of the adjacent link, at each limiting position two limiting surfaces of the end of one link disposed one on each side of said pivot means engaging two complementary limiting surfaces of the end of said adajcent link, thereby providing two points of support about said pivot means and reducing the shear force applied to said pivot means.

15. A chain comprising a plurality of interconnected links, pivot means defining a pivotal point and connecting together the ends of each pair of adjacent links to provide pivotal movement with respect to each other, means for limiting said pivotal movement between two predetermined positions comprising means at each pivotal end of each link defining two pairs of angularly spaced-apart limiting surfaces, wherein said means defining two pairs of spaced-apart limiting surfaces comprises a pair of angularly spaced-apart sectors positioned at one surface of the pivotal end of each link, each sector defining a pair of substantially radially positioned limiting surfaces, the sectors at the end of one of a pair of adjacent interconnected links being positioned intermediate the sectors of the end of the other link at each limiting position two limiting surfaces of the end of one link disposed one on each side of said pivot means engaging two complementary limiting surfaces of the end of said adjacent link, thereby providing two points of support about said pivot means and reducing the shear force applied to said pivot means.

16. A chain comprising a plurality of interconnected links, pivot means defining a pivotal point and connecting together the ends of each pair of adjacent links to provide pivotal movement with respect to each other, means for limiting said pivotal movement between two predetermined positions comprising means at each pivotal end of each link defining two pairs of angularly spaced-apart limiting surfaces, wherein each of said links comprises at least two plates of substantially equal size, each plate comprising a convexly arcuate end and a concavely arcuate end adapted to mate with the concavely arcuate end and convexly arcuate end, respectively, of plates of adjacent links, the plates of each link being positioned in oppositely oriented direction with the concavely arcuate end of one plate overlapping and affixed to the concavely arcuate end of the other plate, at each end of said link the convexly arcuate end of one plate and the concavely arcuate end of the other plate being substantially contiguous with the surface of a common imaginary cylinder having its axis passing through said pivotal point, the limiting surfaces of one end of one link being interposed between complementary limiting surfaces of the end of the adjacent link, at each limiting position two limiting surfaces of the end of one link disposed one on each side of said pivot means engaging two complementary limiting surfaces of the end of said adjacent link, thereby providing two points of support about said pivot means and reducing the shear force applied to said pivot means.

17. A chain according to claim 15 wherein said pivot means comprises pivot pin holes at pivotal points at each end of said links and a pivot pin journaled in said pivot pin holes.

18. A chain comprising a plurality of interconnected links, pivot means defining a pivotal point and connecting together the ends of each pair of adjacent links to provide pivotal movement with respect to each other, means for limiting said pivotal movement between two predetermined positions comprising means at each pivotal end of each link defining two pairs of angularly spaced-apart limiting surfaces, wherein each link is comprised of three plates of substantially the same size, each plate comprising a convexly arcuate end and a concavely arcuate end adapted to mate with the concavely arcuate and convexly arcuate ends, respectively, of adjacent links, two of said plates (30, 44) being oriented in superposition and a third plate (14) being oppositely oriented to said two plates, the concavely arcuate ends (32, 46) of said superposed plates overlapping the concavely arcuate end (16) of said intermediate plate, and means affixing said plates together, the convexly arcuate ends (31, 45) of said superposed plates and the concavely arcuate end (16) of said oppositely oriented plate being substantially contiguous with the surface of a common imaginary cylinder whose axis passes through the pivotal point at the end of said link, and the concave ends (32, 46) of said superposed plates and the convex end (15) of said oppositely oriented plate being substantially contiguous with the surfaces of a common imaginary cylinder whose axis passes through the pivotal point at the other end of said link, said oppositely oriented plate (14) being provided with sectors (20, 20a) extending above the surface of said plate, and one of said superposed plates (30) in engagement with said superposed plate being provided with sector-forming openings (36, 37) defining complementary sectors (25, 26) having limiting surfaces (38, 39, 40, 41), the raised sectors (20, 20a) being positioned within the sector-form openings of an adjacent link, and having limiting surfaces adapted to engage the limiting surfaces of the sectors (25, 26) of the plate (30) at each limiting position of pivotal movement, at each limiting position two limiting surfaces of the end of one link disposed one on each side of said pivot means engaging two complementary limiting surfaces of the end of said adjacent link, thereby providing two points of support about said pivot means and reducing the shear force applied to said pivot means.

19. A chain according to claim 18, wherein said pivot means comprises pivot holes provided in the ends of said links and pivot pins journaled therein.

20. A chain according to claim 18, wherein said limiting surfaces are substantially radially oriented with respect to said pivotal point.

21. A chain comprising a plurality of interconnected links, pivot means defining a pivotal point and connecting together the ends of each pair of adjacent links to provide a pivotal joint with pivotal movement of the adjacent links with respect to each other, wherein each link is comprised of plates each having two convex ends, each end being provided with a pair of sectors each sector defining a pair of limiting surfaces, at each pivotal joint the sectors of one plate being complementary with the sectors of the adjacent plate and being adapted to engage the sectors at each limiting position, two limiting surfaces of the sectors of one plate engaging two limiting surfaces of the sectors of the adjacent plate, at each limiting position two limiting surfaces of the end of one link disposed one on each side of said pivot means engaging two complementary limiting surfaces of the end of said adjacent link, thereby providing two points of support about said pivot means and reducing the shear force applied to said pivot means.

22. A chain according to claim 21 wherein a raised portion is provided at the mid-portion of each link having two concavely arcuate ends adapted to nest and shield the convexly arcuate ends of adjacent links pivotally connected thereto.

23. A chain according to claim 21, wherein said limiting surfaces are substantially radially oriented.

References Cited

UNITED STATES PATENTS

| 1,952,885 | 3/1934 | Oakes | 74—250 |
| 3,053,358 | 9/1962 | Gross | 248—49 X |
| 3,330,105 | 7/1967 | Weber | 191—12 X |

FOREIGN PATENTS 1,460,204  10/1966  France.

CHANCELLOR E. HARRIS, Primary Examiner

U.S. Cl. X.R.

59—78.1